March 9, 1965 L. S. WOODHOUSE 3,172,160
MANUFACTURE OF THERMOPLASTIC MOULDED ARTICLES
Filed March 20, 1963 2 Sheets-Sheet 1

INVENTOR.
LESLIE SINCLAIR WOODHOUSE
BY
*Albert C. Johnston*
ATTORNEY

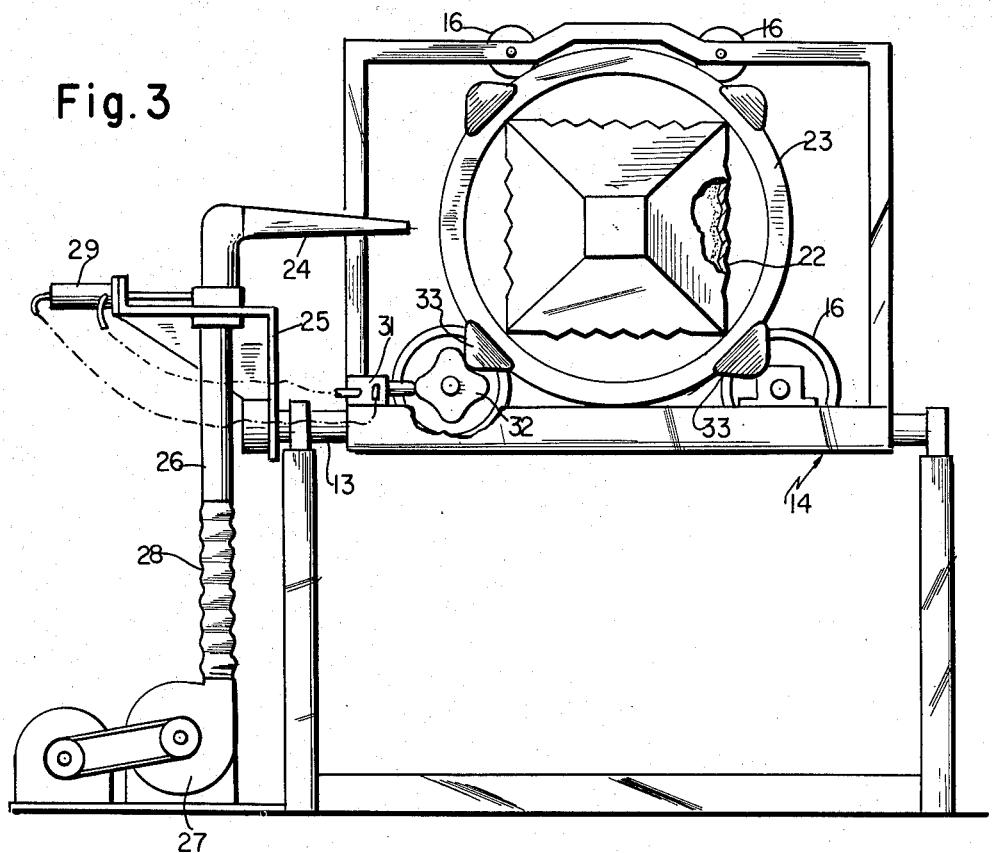
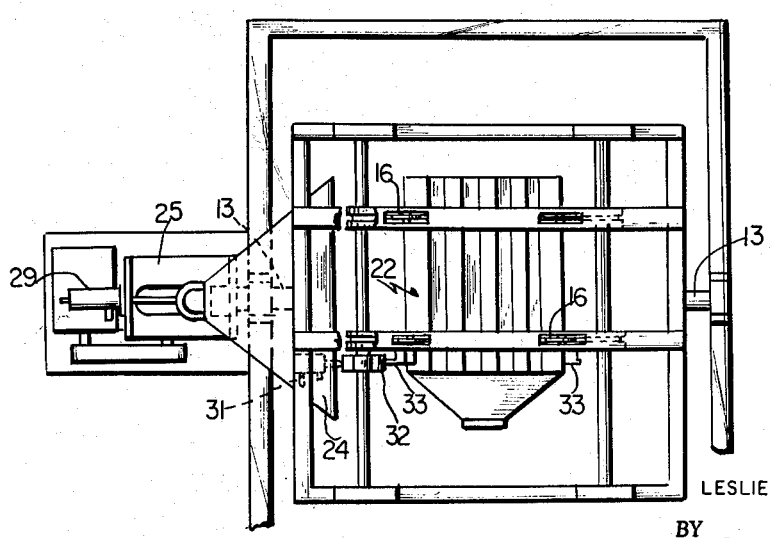

United States Patent Office 3,172,160
Patented Mar. 9, 1965

3,172,160
MANUFACTURE OF THERMOPLASTIC
MOULDED ARTICLES
Leslie Sinclair Woodhouse, Wimbledon, England, assignor to Vasco Industries Corp., New York, N.Y., a corporation of New York
Filed Mar. 20, 1963, Ser. No. 266,602
Claims priority, application Great Britain, Feb. 6, 1963, 10,197/62
2 Claims. (Cl. 18—26)

This invention relates to the manufacturing of thermoplastic moulded articles, and more particularly to the manufacture of large hollow articles which are formed by placing powdered thermoplastic material in a mould and moving the mould whilst it is subjected to heating to melt the thermoplastic material and cause it to spread as a continuous layer on the internal surface of the mould.

It has been customary to support the mould during heating, on a frame which carries the heating means, and to remove the said moulds for cooling, the cooling being carried out by plunging them into water.

Particularly in the case of large articles, however, when the moulds are too heavy to be readily transferred to a water bath, this method of cooling is inconvenient, and it is the object of the present invention to provide means for cooling the moulds whilst they are still mounted in the frame carrying the heating means.

According to the present invention, in apparatus for manufacturing hollow thermoplastic moulded articles comprising a mould mounted for rotation in a frame which is itself mounted for rocking movement about an axis perpendicular to the axis of rotation of the mould, means are provided to direct a stream or streams of cooling air onto the mould, the said means being mounted so as to rock with the said frame and so that rotation of the mould in the frame causes successive portions of the surface of the mould to be presented to said stream or streams of cooling air, and being maintained at a substantially constant distance from the source of the air stream or streams directed thereonto.

The means to direct cooling air on to the mould may comprise a plurality of duct units each having mounted in it a fan to blow air on to the surface of the mould.

Alternatively, the means to direct cooling air on to the mould may comprise a nozzle of fishtail shape lying in a plane radial to the axis of rotation of the mould and through which air is blown by a fan mounted in a fixed position and connected to the nozzle by means of a flexible duct.

The invention is hereinafter described with reference to the accompanying diagrammatic drawings, in which:

FIGURE 3 is an end view of another arrangement of cooling means according to the invention; and FIGURE 4 is a plan view of the arrangement shown in FIGURE 3.

Figure 1:
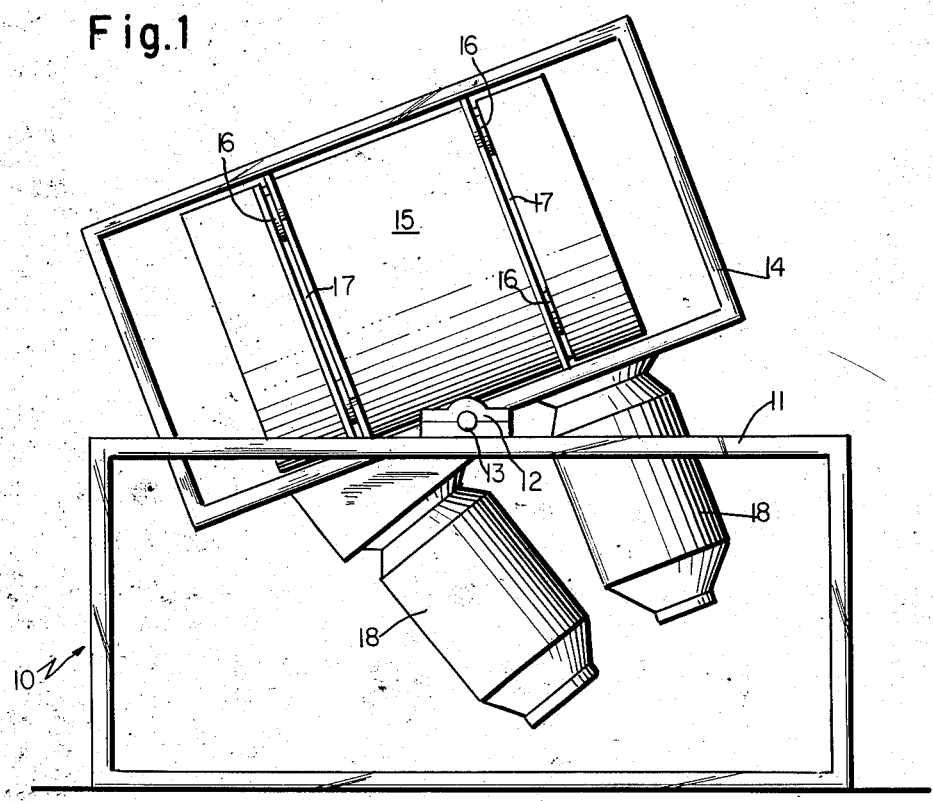
FIGURE 1 is a side elevation of one arrangement of cooling means according to the invention.
Figure 2:
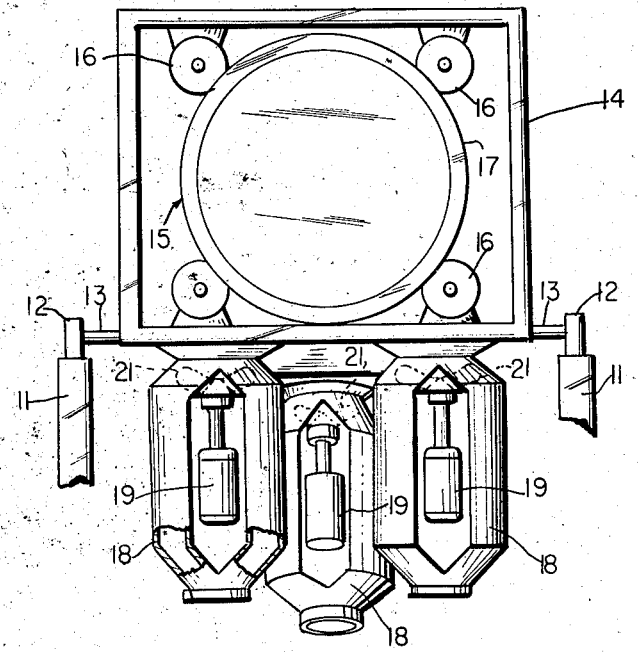
FIGURE 2 is an end view of the arrangement shown in FIGURE 1.

Referring to FIGURES 1 and 2 of the drawings, a fixed supporting structure 10 includes a pair of horizontal beams 11 on which are mounted bearings 12 for a shaft 13 on which is mounted a frame 14 rockable about the axis of the said shaft 13 by any convenient means (not shown) such as an electric motor driving a crank connected to the said frame by a connecting rod.

The frame 14 has rotatably mounted in it a mould 15 which is shown, for example, as being cylindrical, the mould 15 being supported for rotation by rollers 16 mounted in the frame and engaging grooved tracks 17 on the mould, so that the said mould is held against axial movement relative to the frame. The mould has a removable end (not shown) to enable powdered thermoplastic material to be placed therein and to enable finished mouldings to be removed therefrom. Suitable means (not shown) are provided for rotating the mould, such as an electric motor driving one or more of the rollers 16.

Gas burners (not shown) are mounted on the frame 14 so as to enable the mould to be heated, the burners conveniently being mounted in a plane radial to the axis about which the mould rotates so that the surface of the said mould travels past them as the rotation of the mould takes place.

The frame has fixed to it a number of air duct units 18 directed upwardly towards the surface of the mould 15 and arranged, for example, as shown in FIGURES 1 and 2, two units being placed side-by-side with their axes substantially perpendicular to the axis of rotation of the mould, and a third being placed in a radial plane with respect to the said axis of rotation and with its own axis oblique to the axis of rotation.

The duct units 18 are divided longitudinally for part of their length to provide spaces in which are mounted electric motors 19 to drive fans 21 in the duct units 18, the fans 21 producing the required flow of air through the duct units.

Thus air is drawn through the duct units 18 from below the frame 14 and is blown against the mould, the latter being rotated so that the air is blown successively against different parts of its surface.

The steps of production of a moulded article such as a container thus consist of the steps of inserting powdered thermoplastic material, for example polyethylene, into the mould, placing the removable end in position, lighting the gas burners, simultaneously rotating the mould in the frame and rocking the frame for a predetermined time so that the thermoplastic material is melted and spread evenly over the surface of the mould. The gas burners are then shut off, and the electric motors driving the fans started, and rotation of the mould is continued whilst air is blown on to it, until the mould and the container therein are cooled to a temperature at which they can be handled. The mould is then opened, and the container is removed therefrom.

In the embodiment of the invention shown in FIGURES 3 and 4 a rocking frame 14 is provided similar to that shown in FIGURES 1 and 2, and a mould 22 of generally square shape in cross-section is mounted in rings 23 which are rotatably supported by rollers 16 as described with reference to FIGURES 1 and 2. The cooling air, in this embodiment, is directed on to the mould 22 by a nozzle 24 of fishtail shape lying in a plane substantially radial to the axis of rotation of the mould and having its mouth extending parallel to the said axis. The nozzle 24 is mounted on a bracket 25 fixed to the pivot shaft 13 of the frame 14 so that the nozzle rocks with the said frame, a duct 26 leading to the nozzle from a stationary fan 27 including a flexible portion 28 to permit the rocking movement of the nozzle.

The nozzle 24 is slidably supported on the bracket 25 so that it can move towards and away from the axis of rotation of the mould 22 and maintain a substantially uniform distance from the surface of the mould. The nozzle 24 is moved to and fro by liquid or gas under pressure acting in a double-acting piston-and-cylinder unit 29 under the control of a valve 31 which is in turn operated by a cam 32 to cause the nozzle 24 to move outwardly as a corner of the mould approaches the plane of the nozzle and inwardly as the corner moves away from that plane. The cam is shown as of four-lobed shape and is rotated step-by-step by projections 33 carried by one of the rings 23 and engaging between the lobes of the cam 32 to rotate it. Cams of different shapes may be employed with moulds of different cross-section and the cams may, if desired, be driven continuously from one of the rings 23 at such a rate that they make one rotation for each revolution of the mould.

The procedure to produce a container is the same with this embodiment as with that previously described.

What is claimed is:

1. Apparatus for manufacturing hollow thermoplastic moulded articles comprising a a mold mounted for rotation in a frame which is itself mounted for rocking movement about an axis perpendicular to the axis of rotation of the mold, wherein means are provided to direct a stream or streams of cooling air onto the mold, the said means including a nozzle mounted so as to rock with the said frame and so that rotation of the mold in the frame causes successive portions of the surface of the mold to be presented to said stream or streams of cooling air, and means to move said nozzle in and out automatically as the mold rotates so as to maintain said nozzle at a substantially constant distance from the surface of a non-circular mold.

2. Apparatus according to claim 1, said nozzle being one of fishtail shape lying in a plane radial to the axis of rotation of the mold, and means including a fan mounted in a fixed position and connected to the nozzle by means of a flexible duct for blowing air through said nozzle.

References Cited by the Examiner
UNITED STATES PATENTS
2,573,693 11/51 De Bell _____ 18—26

WILLIAM J. STEPHENSON, *Primary Examiner.*
MICHAEL V. BRINDISI, *Examiner.*